US011188594B2

(12) United States Patent
Kadwe et al.

(10) Patent No.: US 11,188,594 B2
(45) Date of Patent: Nov. 30, 2021

(54) WILDCARD SEARCHES USING NUMERIC STRING HASH

(71) Applicant: Oracle International Corporation, Redwood Shores, CA (US)

(72) Inventors: Rahul Manohar Kadwe, Sunnyvale, CA (US); Saurabh Naresh Netravalkar, Santa Clara, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 570 days.

(21) Appl. No.: 15/891,145

(22) Filed: Feb. 7, 2018

(65) Prior Publication Data

US 2019/0243926 A1 Aug. 8, 2019

(51) Int. Cl.
*G06F 16/903* (2019.01)
*G06F 16/22* (2019.01)
*G06F 16/242* (2019.01)
*G06F 16/31* (2019.01)

(52) U.S. Cl.
CPC .... *G06F 16/90344* (2019.01); *G06F 16/2255* (2019.01); *G06F 16/243* (2019.01); *G06F 16/316* (2019.01)

(58) Field of Classification Search
CPC .. G06F 16/2255; G06F 16/243; G06F 16/316; G06F 16/90344
See application file for complete search history.

(56) References Cited

U.S. PATENT DOCUMENTS

| | | | | |
|---|---|---|---|---|
| 7,010,522 | B1 * | 3/2006 | Jagadish | G06F 16/332 |
| 8,209,178 | B1 * | 6/2012 | Talbot | G10L 15/197 |
| | | | | 704/255 |
| 8,589,405 | B1 * | 11/2013 | Estan | G06F 16/90344 |
| | | | | 707/745 |
| 9,256,644 | B1 * | 2/2016 | Spellward | G06F 16/152 |
| 9,405,823 | B2 * | 8/2016 | Mamou | G06F 16/3343 |
| 9,558,233 | B1 * | 1/2017 | Kim | G06F 16/951 |
| 2006/0206527 | A1 * | 9/2006 | Hattori | G06F 16/31 |
| 2007/0250501 | A1 * | 10/2007 | Grubb | G06F 16/3343 |
| 2007/0250519 | A1 * | 10/2007 | Fineberg | H03M 7/30 |

(Continued)

*Primary Examiner* — Mark D Featherstone
*Assistant Examiner* — Navneet Gmahl
(74) *Attorney, Agent, or Firm* — Hickman Becker Bingham Ledesma LLP

(57) ABSTRACT

Techniques herein improve computational efficiency for wildcard searches by using numeric string hashes. In an embodiment, a plurality of query K-gram tokens for a term in a query are generated. Using a first index, an intersection of hash tokens is determined, wherein said first index indexes each query K-gram token of said K-gram tokens to a respective subset of hash tokens of a plurality of hash tokens, each of hash token of said plurality of hash tokens corresponding to a term found in one or more documents of a corpus of documents. The intersection of hash tokens comprises only hash tokens indexed to all of said plurality of query K-gram tokens by said first index. Using a second index, documents of said corpus of documents that contain said term are determined, said second index indexing said hash tokens to a plurality of terms in said corpus of documents and for each term of said plurality of terms, a respective subset of documents of corpus of documents that contain said each term.

18 Claims, 6 Drawing Sheets

Enhanced Hash Based K-Gram Index coupled with a Full-Text Inverted Index

| K-Gram | K-Gram Posting List (Hash Tokens) | | Token Text | Token Hash | Inverted Index Posting List |
|---|---|---|---|---|---|
| ora | 279, ... , 785, ... , 321 | | oracle | 279 | 1, 5, 15, ... |
| rac | ... , 279, ... | | floral | 321 | 1, 8, 15, ... |
| ral | ... , 321, ... , 785, ... | | coral | 785 | 7, 8, 18, ... |
| ... | ... | | ... | ... | ... |

K-Gram Index 204      Full-Text Inverted Index 202

(56) References Cited

U.S. PATENT DOCUMENTS

| | | | |
|---|---|---|---|
| 2007/0255698 A1* | 11/2007 | Kaminaga | G06F 21/6227 |
| 2008/0059146 A1* | 3/2008 | Liu | G06F 40/45 704/2 |
| 2008/0086488 A1* | 4/2008 | Nomula | G06F 40/232 |
| 2008/0306919 A1* | 12/2008 | Iwayama | G06F 16/3331 |
| 2009/0216752 A1* | 8/2009 | Terui | G06F 16/33 |
| 2009/0276467 A1* | 11/2009 | Scholtes | G06F 16/30 |
| 2010/0077015 A1* | 3/2010 | Eshghi | G06F 17/10 708/400 |
| 2011/0019925 A1* | 1/2011 | Luk | G06F 16/907 382/218 |
| 2011/0145260 A1* | 6/2011 | Ichino | G06F 16/9014 707/747 |
| 2011/0258237 A1* | 10/2011 | Thomas | G06F 16/90344 707/803 |
| 2013/0110839 A1* | 5/2013 | Kirshenbaum | G06F 16/35 707/740 |
| 2013/0339000 A1* | 12/2013 | Zhang | G06F 40/284 704/9 |
| 2014/0067373 A1* | 3/2014 | Wasserblat | G10L 15/02 704/9 |
| 2014/0164352 A1* | 6/2014 | Denninghoff | H03H 9/25 707/711 |
| 2014/0307737 A1* | 10/2014 | Levy | G06F 16/245 370/392 |
| 2015/0095642 A1* | 4/2015 | Spalka | G06F 21/6227 713/161 |
| 2015/0106619 A1* | 4/2015 | Spalka | G06F 16/235 713/165 |
| 2015/0220593 A1* | 8/2015 | Cohen | G06F 21/566 707/747 |
| 2015/0278265 A1* | 10/2015 | Baessler | G06F 16/2228 707/741 |
| 2016/0154851 A1* | 6/2016 | Sugaya | G06F 16/2228 707/741 |
| 2016/0283597 A1* | 9/2016 | Furst | G06F 16/313 |
| 2016/0306877 A1* | 10/2016 | Winther | G06F 16/35 |
| 2018/0143979 A1* | 5/2018 | Garbinato | F41B 5/12 |
| 2018/0285377 A1* | 10/2018 | Kriz | G06F 16/951 |
| 2018/0322062 A1* | 11/2018 | Watkins | G06F 12/0804 |
| 2018/0349472 A1* | 12/2018 | Kohlschuetter | G06F 16/3322 |
| 2019/0057154 A1* | 2/2019 | Philip | G06F 16/316 |
| 2019/0188396 A1* | 6/2019 | Chung | G06F 16/4393 |
| 2020/0125674 A1* | 4/2020 | Arunski | G06F 16/328 |

* cited by examiner

FIG. 2

Enhanced Hash Based K-Gram Index coupled with a Full-Text Inverted Index

Full-Text Inverted Index 202

| Token Text | Token Hash | Inverted Index Posting List |
|---|---|---|
| oracle | 279 | 1, 5, 15, ... |
| floral | 321 | 1, 8, 15, ... |
| coral | 785 | 7, 8, 18, ... |
| ... | ... | ... |

K-Gram Index 204

| K-Gram | K-Gram Posting List (Hash Tokens) |
|---|---|
| ora | 279, ..., 785, ..., 321 |
| rac | ..., 279, ... |
| ral | ..., 321, ..., 785, ... |
| ... | ... |

WILDCARD SEARCHES USING NUMERIC STRING HASH

FIELD OF THE INVENTION

The present invention relates to database full-text search.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

As technology advances, increasingly huge volumes of data are being generated and stored every second by data management systems. The ability to efficiently search for relevant parts of the data from the vast repository of diverse and unstructured data is one of the most important functions of data management systems. Hence, search technology is ubiquitous in all industrial as well as social domains, be it e-commerce, linguistics, catalogs, academia or data exploration.

Due to diversity of data sources and unstructured nature of data, users may not know the exact search terms of what they want to search for. Modern search engines allow wildcard searching where users can enter wildcard symbols like % (which matches zero or more characters) to increase document recall and make their search less strict. For example, the wildcard expression "% or %" will match any values that have "or" in any position in a string. Coupled with spell-correction and query recommendation, this makes for an excellent user experience.

Currently, full-wildcard query support requires index structures, in addition to a standard full-text inverted index, which are expensive to create and maintain and require computationally intensive queries. Additionally, the processing of wildcard queries involves expensive string comparisons to identify matching terms and documents that satisfy the query. Techniques are desired to improve computational efficiency with respect to wildcard queries.

Discussed herein are approaches for improving computational efficiency for wildcard queries.

BRIEF DESCRIPTION OF THE DRAWINGS

In the drawings:

FIG. 2 is a diagram depicting a hash based K-gram index coupled with a full-text inverted index according to an embodiment of the present invention.

DETAILED DESCRIPTION

Figure 1:
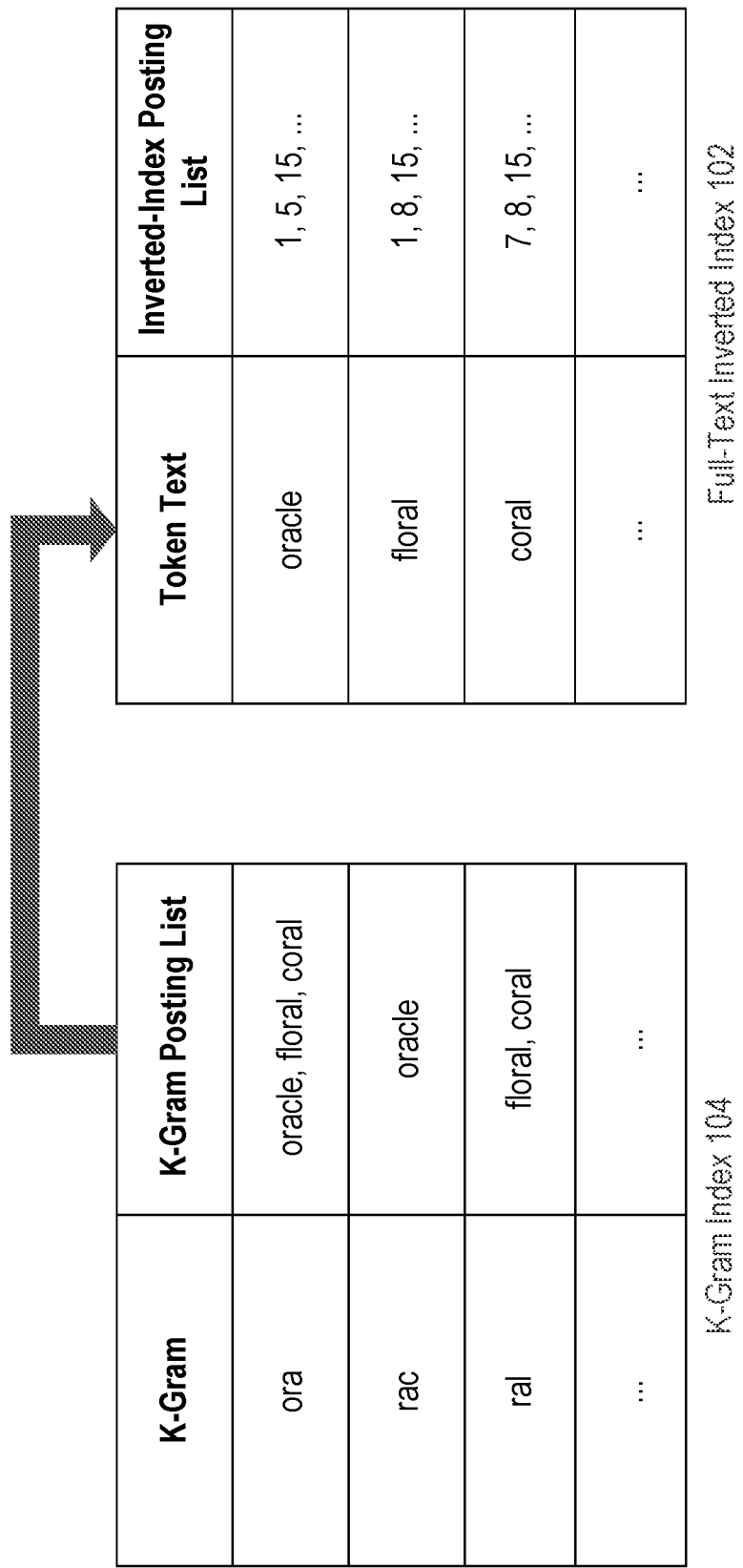
FIG. 1 is a diagram depicting a standard K-gram index coupled with a full-text inverted index according to an embodiment of the present invention.

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Techniques are provided for improving computational efficiency for wildcard queries by using numeric string hashes. As described herein, a K-gram index can be used to evaluate wildcard queries.

A K-gram is a consecutive string of K bytes, or characters, where each gram represents a contiguous sequence of characters that exist within a term. A K-gram index maps the grams of terms to a list of terms, referred to as a K-gram posting list, that were used to generate the respective gram.

K-gram indexing can be used to support wildcard searches. A K-gram query evaluation algorithm for a wildcard search may involve finding out all the terms that are common across all the generated grams of the query term. For example, for a wildcard query that specifies a wildcard expression such as '%dat%bas%' that has the grams 'dat' and 'bas', the respective posting lists for each of the grams is fetched, and the intersection is computed by identifying matching string values between the posting lists for each gram. The resulting group of terms is then looked up in an inverted index to fetch the relevant documents that contain the intersecting terms.

In a string-based implementation, the posting list intersection computations as well as inverted index lookups involve a large number of string comparisons and may require main memory proportional to the size of the posting lists from the K-gram index and full-text inverted index.

Instead of using strings to represent the terms in a posting list, integer hash values can be computed and used to represent the strings of terms in a posting list. Using this approach, the posting list intersection of K-grams can be computed by comparing the integer hash values from a hashed K-gram posting list to identify matches instead of expensively comparing strings from a non-hashed K-gram posting list. Additionally, once the intersection is computed, the inverted index can be used for equality lookup using hash values instead of strings.

Wildcard Queries

Wildcard queries are based on character pattern matching between the characters specified in a wildcard expression in a query and terms in documents that contain those character patterns.

Wildcard expressions can be broadly categorized into three categories—right truncated, left truncated and double truncated queries. A right truncated expression of the form 'example%' will match all terms beginning with the pattern 'example. A left truncated expression of the form'%example' will match all terms ending with the pattern 'example'. A double truncated expression of the form '%example%' will find all terms that contain the sub string 'example'.

A right truncated expression search of the form 'example%' is efficiently performed by using an index lookup on the tokens of a standard inverted index. For example, a right truncated search of the form 'example%' will find all terms beginning with the pattern 'example' by using an index lookup on the token of a standard inverted index such as the inverted index shown in 102 of FIG. 1.

A token may be defined as a string of one or more characters or a series of one or more integers. An example of a token is a term or subphrase such as "oracle" or a number such as "95126". A K-gram token may include a string of one or more characters that identify a gram. A hash token is a hash value generated by a hash function applied to a token.

However, for a left-truncated expression search of the form '%example' as well as double-truncated expression search of the form '%example%', an index lookup cannot be used. Left and double truncated expression searches require building a reverse index along with the another index, such as a B-TREE index, on the tokens. A reverse index may be used for an efficient left-truncated expression search at the cost of twice the disk storage by using two indexes on the same set of tokens from the inverted index. A double-truncated expression search may be completed by post filtering the intersection of results obtained from the usual index and the reverse index.

Thus, full-wildcard query support requires index structures in addition to the standard full-text inverted index, which are expensive to create and maintain and require computationally intensive query pipelines.

Another approach to servicing wildcard queries involves the use of the K-gram indexing, known to be efficient for all types of wildcard queries.

K-Gram Indexing

A K-gram is a consecutive string of k bytes, or characters, where K is a whole number. For example, the 3-grams for the term 'oracle' are: '$or', 'ora', 'ad', 'le$' where '$' marks the start and end of the term.

A K-gram index maps the grams of terms to a list of terms, referred to as a K-gram posting list, that were used to generate the respective gram. For example, FIG. 1 shows a K-gram index 104 with several example field values. The K-gram index maps each gram shown in the "K-gram" column such as 'ora', 'ral' to terms from the "K-gram Posting List" column. Each gram represents a contiguous sequence of characters that exist within each term from the associated K-gram posting list row. For example, the gram 'ora' makes up the first three characters of the term 'oracle', the third, fourth, and fifth characters of the term 'floral', and the second, third, and fourth characters of the term 'coral'.

A standard K-gram query evaluation algorithm involves finding out all the terms that are common across all the generated grams of the query term. For example, when K=3, a double truncated wildcard query expression such as '%dat%bas%' has the grams 'dat' and 'bas'. The respective posting lists for each of the grams is fetched, and the intersection is computed by identifying matches between the posting lists for each gram. For example, finding the intersection between grams 'ora' and 'rac' would require comparing the string terms: 'oracle', 'floral', and 'coral' from the 'ora' posting list to the term 'oracle' from the 'rac' posting list.

After the intersection is determined, an additional post-processing pass is done to filter out false positives. In this step, the terms identified from the intersection are compared to the original query term. Terms identified from the intersection that do not match or satisfy the ordering specified by the original query term are filtered out of the resulting group of terms. The resulting filtered group of terms is then looked up in the Full-Text Inverted Index 102 to fetch the relevant documents from the "Inverted-Index Posting List" column. From the example above, the intersecting term(s) between the grams 'ora' and 'me' would only include the term 'oracle' because 'oracle' is the only common term between the posting lists of each gram. The term 'oracle' is looked up in the Full-Text Inverted Index 102 to determine the document numbers from the "Inverted-Index Posting List" column that correspond to the intersecting term.

In a string-based implementation, the posting list intersection computations as well as inverted index lookups involve a large number of string comparisons and may require main memory proportional to the size of the posting lists from the K-gram index and full-text inverted index.

Although K-gram indexing can be used to support wildcard queries, the implementation involves storing string postings lists, such as the "K-gram Posting List" column from the K-gram Index 104 of FIG. 1, where each term is replicated once for each of its grams. Considering each term has 'N+3−K' grams, using a K-gram index for wildcard queries requires substantial storage overhead for real world data, which for multi-byte character sets may have an average term length as high as tens of bytes, depending on the language and the corpus being indexed.

Hash Based K-Gram Index Coupled with Full-Text Inverted Index

An improvement to the approach of using K-gram indexing for wildcard queries includes using a hash function on each string value of the K-gram posting list and storing the resultant hash value of each string value in the K-gram posting list in the K-gram index. For example, FIG. 2 shows a hash based K-gram Index 204 where the "K-gram Posting List" column stores hash token values of the associated term that is mapped to the respective gram from the "K-gram" column.

Using this improvement, the posting list intersection of K-grams can be computed more efficiently (using less clock cycles, memory, etc.) by comparing the integer hash values from the hashed "K-gram Posting List" to identify matches instead of far less efficiently comparing string values from the non-hashed K-gram posting list, such as shown as the "K-gram Posting List" in the K-gram Index 104 in FIG. 1. Less memory, processor work, and time is used to execute queries and searches that are based on wild card expressions.

Additionally, once the intersection is computed, the inverted index, such as the Full-Text Inverted Index 202 from FIG. 2, can be used for more efficient equality lookup using token-hashes instead of token strings. An extra column is added in the inverted index, such as the "Token Hash" column from the full-text inverted index 202 of FIG. 2, to store the hash of the string tokens. An index is added to the extra column that is optimized for numeric equality searches. Because the index is created on a numeric column, it requires minimal maintenance overhead during DML operations and aids speedy query response time. Since the look-up of intersecting values from the inverted index is completed using the token hash instead of the actual tokens, the query processor can avoid string comparisons in favor of native numeric comparisons.

Figure 3:
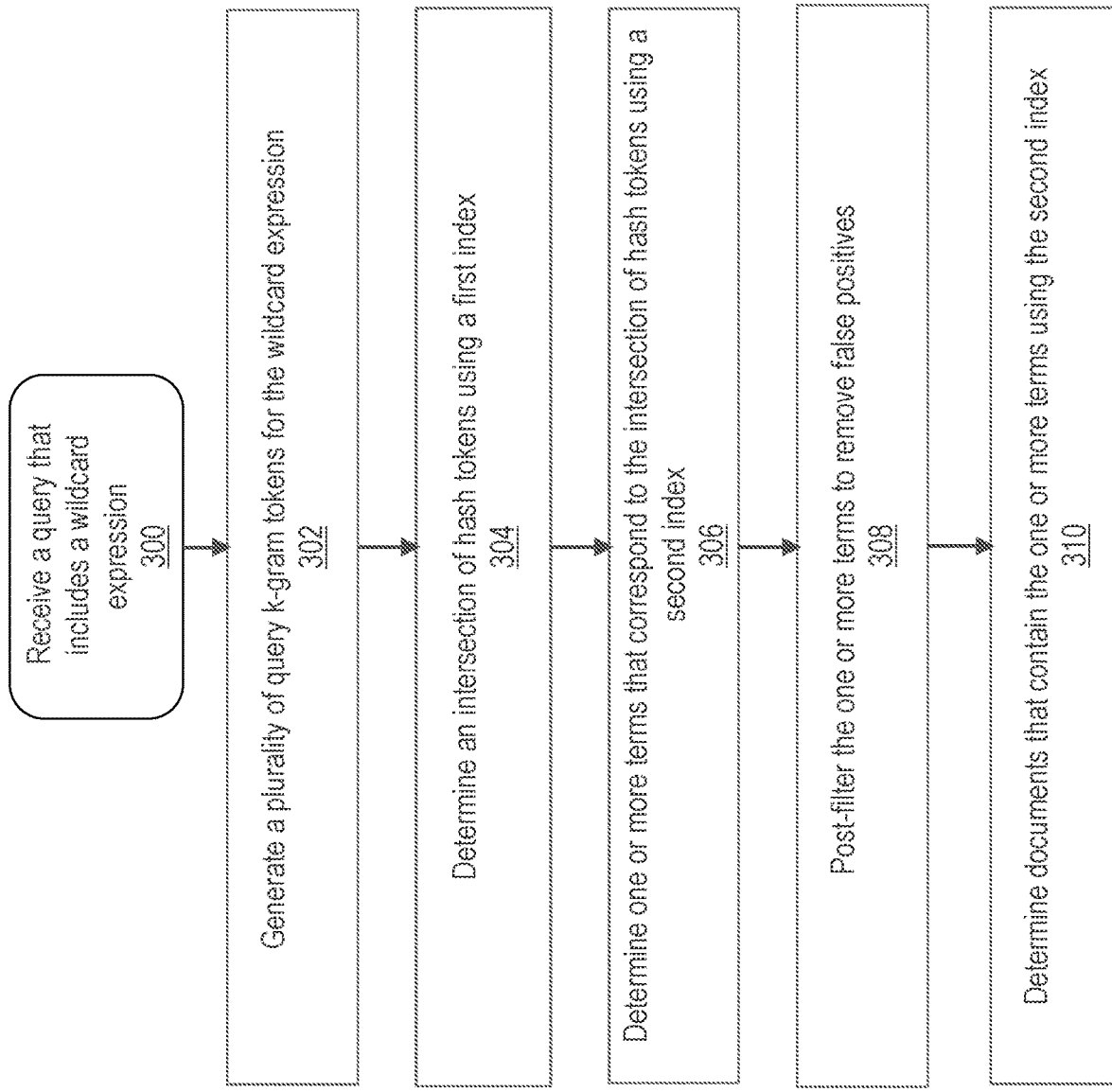
FIG. 3 is a flow chart depicting a process for executing a wildcard query according to an embodiment of the present invention.

FIG. 3 illustrates an example process for using a hash based K-gram index coupled with a full-text inverted index to process wildcard queries.

At step 300, a query is received. The query may include a wildcard expression. In an embodiment, the wildcard expression may be a left truncated, right truncated, or double truncated wildcard expression.

At step 302, a plurality of K-gram tokens are generated for the wildcard expression.

At step 304, an intersection of hash tokens is determined using a first index. In an embodiment, a first index, such as a K-gram index, is generated wherein each K-gram token of the plurality of K-gram tokens is indexed to a respective subset of hash tokens of a plurality of hash tokens, each of hash token of the plurality of hash tokens corresponding to a term found in one or more documents of a corpus of documents. For example, such a K-gram index is represented by K-gram Index 204 in FIG. 2.

In an embodiment, the intersection of hash tokens comprises only hash tokens that are indexed to all of the plurality of query K-gram tokens by the first index.

At step 306, one or more terms that correspond to the intersection of hash tokens are determined using a second index. In an embodiment, the second index comprises a full-text inverted index that indexes the hash tokens from step 304 to a plurality of terms in a corpus of documents and for each term of the plurality of terms, a respective subset of documents of the corpus of documents that contain said each term. For example, such a full-text inverted index is represented by Full-Text Inverted Index 202 in FIG. 2.

With hash-based K-gram, the full-text inverted index may be used for looking up tokens using the hash tokens determined in step 304. The lookup can be achieved efficiently using the hash token index that is optimized for numeric equality searches. In contrast, with a string-based K-gram implementation, every string in the lookup list would require a comparison with relevant strings from the inverted index tokens.

At step 308, the one or more terms are post-filtered to remove false positives. In an embodiment, the terms determined in step 306 are compared individually against the original wildcard expression to remove false positives. For example, a right truncated wildcard expression search 'red %' will find all terms beginning with the pattern 'red'. The algorithm discussed above at step 302 may produce the K-grams '$re' and 'red', where the character $ is used to denote the beginning or end of a term. The one or more terms determined by steps 304 and 306 may include a term such as 'retired', which satisfies the intersection of gram '$re' and 'red', but does not match the original query 'red %' because 'red' only exists at the end of the determined term 'retired'. To remove the false positives, the terms determined by step 306 are compared to the original wildcard expression specified by the query in a string-matching operation to remove terms that do not match the original query term. From the above example, the term 'retired' will be compared to the wildcard expression 'red %'. The algorithm will identify that the first three string characters of 'retired' do not match the wildcard expression 'red %' and the term 'retired' will be postfiltered. In general, terms identified from step 306 that do not match or satisfy the ordering specified by the original query term are filtered out of the resulting group of terms.

At step 310, documents that contain the one or more terms are determined using the second index. As discussed in step 306, the second index comprises a full-text inverted index that indexes the hash tokens from step 304 to a plurality of terms in a corpus of documents and for each term of the plurality of terms, a respective subset of documents of the corpus of documents that contain said each term, as shown by the Full-Text Inverted Index 302 in FIG. 2.

The documents may be looked up in the full-text inverted index by using the hash tokens that correspond to the terms that survive the post-filtering step of 308.

The documents of said corpus of documents that contain the one or more terms are then returned as a result of the query.

In an embodiment, when a new document is identified by the database system, the document needs to be indexed by the Full-Text Inverted Index 202 and terms from the document that are not currently indexed by the K-gram and full-text inverted indexes need to be added to the K-gram index along with the full-text inverted index. When a new document is identified by the system, each term in the document is checked for existence in the Full-Text Inverted Index 202 using an index on the "Token Text" column. If the term already exists in the index, the corresponding document identifier is added to the posting list that corresponds to the existing term. By comparing the strings of the terms from the Full-Text Inverted Index 202 to the terms from the new document before adding the terms to the index, having duplicate terms in the index can be avoided. If the term does not exist in the index, the term is added to the Full-Text Inverted Index 202 along with the corresponding hash value for the term and the document identifier. In response to adding a new term to the Full-Text Inverted Index 202, the K-gram Index 204 is updated to include the hash value of the new term for the grams that map to the new term. This embodiment may be also implemented using the K-Gram Index 104 coupled with Full-Text Inverted Index 102 of FIG. 1, that is, without the hash columns shown in the K-Gram Index 204 and Full-Text Inverted Index 202 of FIG. 2.

FIG. 2 may be used to illustrate an example of the algorithm of FIG. 3. For example, starting with step 300, if a double truncated wildcard expression such as '%oracle%' is received, the 3-gram of the query term would include the K-gram tokens: 'ora', 'ad', and 'cle' as determined by step 302. As determined by step 304, the intersection of the hash tokens corresponding to each respective K-gram token would include the hash token '279' because the hash token '279' exists in the hash token posting list for each respective K-gram token. Once the intersection is determined by step 304, the hash token '279' is looked up in the full-text inverted index, such as in step 306, and the corresponding text token, 'oracle', is identified. The text token 'oracle' is then post-filtered by step 308, and the corresponding documents may be looked up in the full-text inverted index by using the hash token '279'. The documents 1, 5, 15, . . . will be returned by the query.

System Overview

Figure 4:
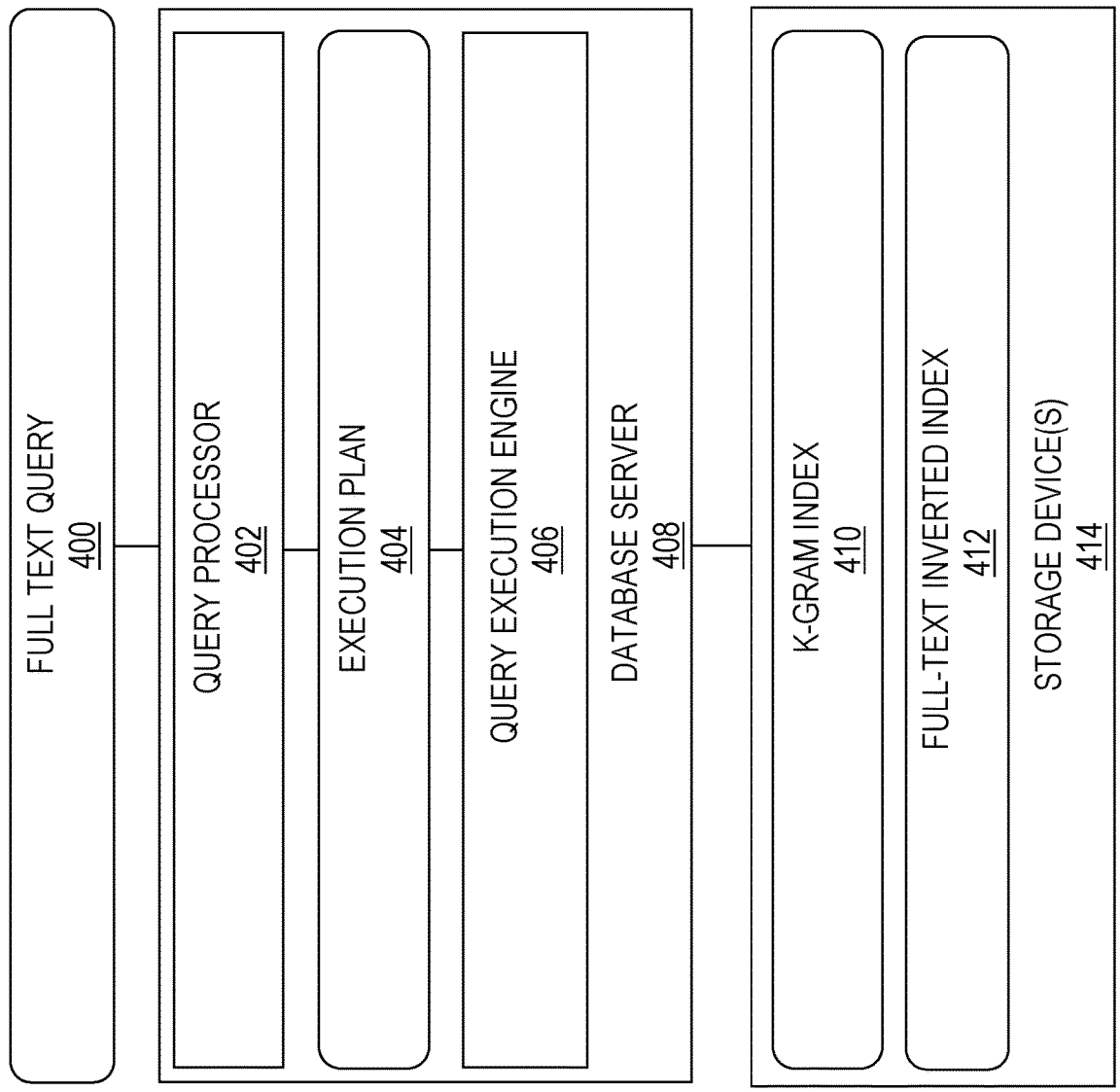
FIG. 4 illustrates an example system for evaluating a full text query using posting lists.

FIG. 4 illustrates an example system for evaluating a full text query using posting lists. As shown, a full text query is received by a database server 408 at a query processor 402. Query processor 402 generates an execution plan 404 that instructs the query execution engine 406 how to execute the query. For example, the execution plan may instruct query execution engine 406 to perform some operations before others, or to use certain indices to access data needed for the query. Query processor 402 and/or query execution engine 406 may have access to storage device(s) 414, which may include an allocated portion of memory in database server 408, disk storage in an underlying database, or some other non-transitory storage. Query processor 402 may instruct query execution engine 406 to use K-gram index 410, full-text inverted index 412 to compute results for full text query 400. Full-text inverted index 412 may be represented by a data structure such as a table, as shown graphically as the full-text inverted index 102, 202 in FIGS. 1 and 2, respectively. K-gram index 410 may also be represented by a data structure such as a table, as shown graphically as the K-gram Index 104, 204 in FIGS. 1 and 2, respectively. Indexes may also be persisted in memory or on-disk using a variety of data structures.

Database Systems

Embodiments of the present invention are used in the context of DBMSs. Therefore, a description of a DBMS is useful.

A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Software Overview

Figure 5:
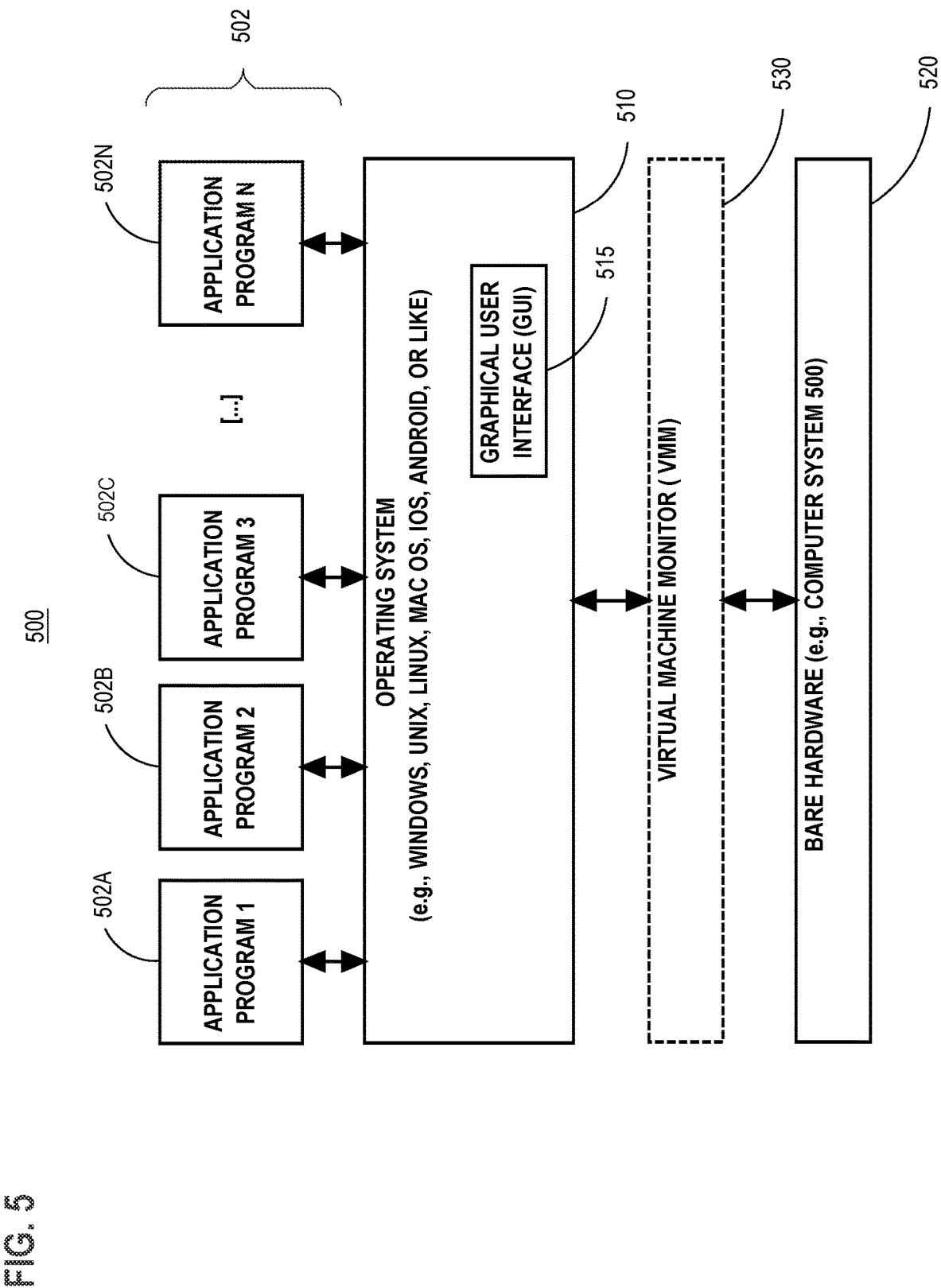
FIG. 5 is a diagram depicting a software system upon which an embodiment of the invention may be implemented.
Figure 6:
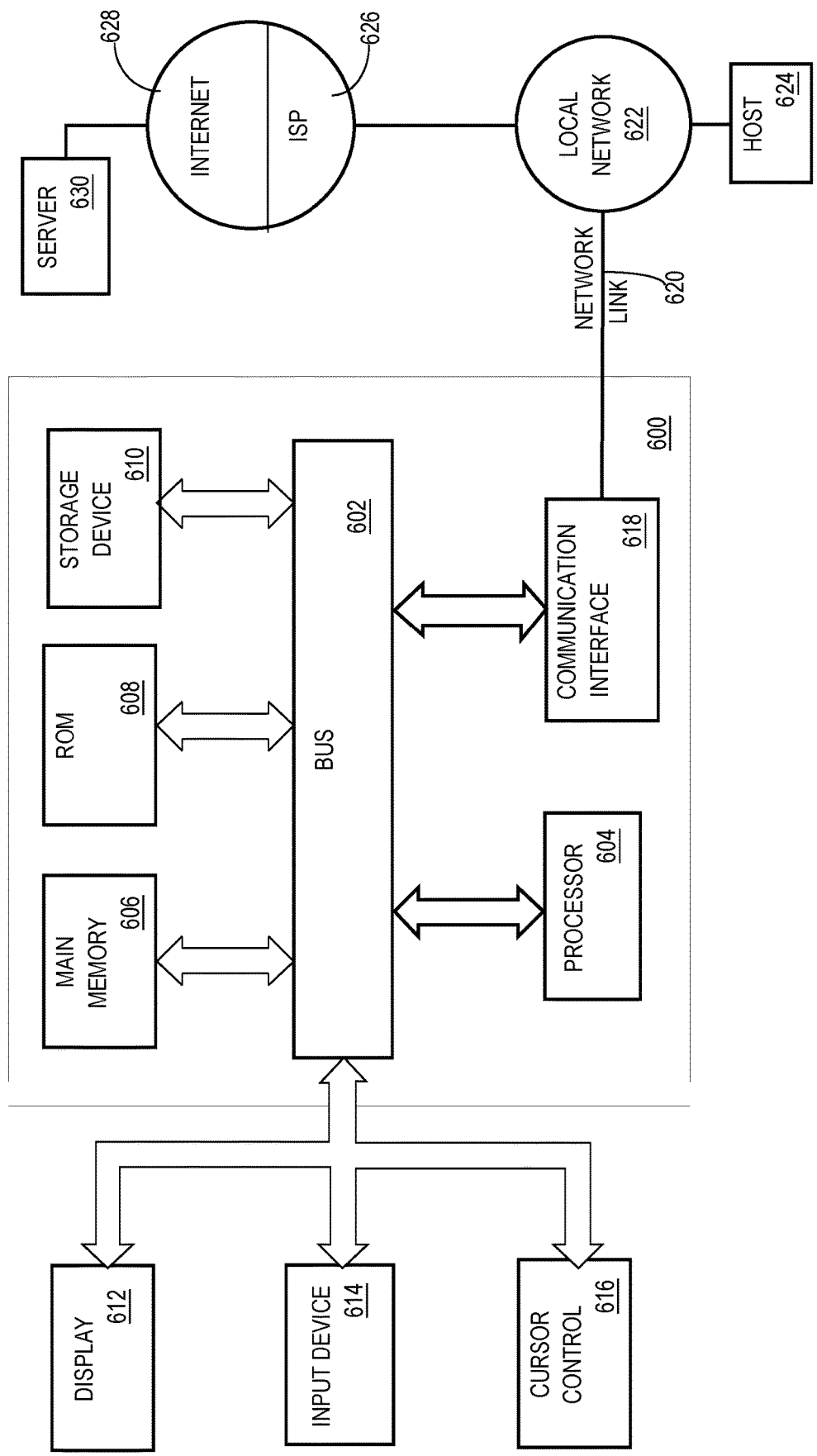
FIG. 6 is a diagram depicting a computer system that may be used in an embodiment of the present invention.

FIG. 5 is a block diagram of a basic software system 500 that may be employed for controlling the operation of computing system 600 of FIG. 6. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 600. Software system 500, which may be stored in system memory (RAM) 606 and on fixed storage (e.g., hard disk or flash memory) 610, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 402N, may be "loaded" (e.g., transferred from fixed storage 610 into memory 606) for execution by the system 500. The applications or other software intended for use on computer system 600 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 604) of computer system 600. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 600.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 600 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 402 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A method comprising:
generating a plurality of query K-gram tokens for a wildcard expression in a query;
using a first index, determining an intersection of hash tokens, wherein said first index indexes each query K-gram token of said plurality of query K-gram tokens to a respective subset of hash tokens of a plurality of hash tokens, each hash token of said plurality of hash tokens corresponding to a term found in one or more documents of a corpus of documents;
wherein determining the intersection of hash tokens includes performing one or more numeric comparisons of hash tokens;
wherein said intersection of hash tokens comprises only hash tokens indexed to all of said plurality of query K-gram tokens by said first index;
using a second index, determining one or more terms that correspond to the intersection of hash tokens, said second index indexing said plurality of hash tokens to a plurality of terms in said corpus of documents
wherein determining the one or more terms that correspond to the intersection of hash tokens includes, for each hash token of said intersection of hash tokens, using a numeric equality search to lookup in said second index one or more terms that are indexed to said each hash token;

filtering the one or more terms that correspond to the intersection of hash tokens to remove a term from the one or more terms that does not match said wildcard expression thereby generating filtered one or more terms;

determining documents of said corpus of documents that contain the filtered one or more terms.

2. The method of claim 1, wherein said first index comprises a table and wherein said second index comprises a table.

3. The method of claim 1, wherein said second index includes a secondary index on a numeric column that contains said plurality of hash tokens.

4. The method of claim 3, wherein determining documents of said corpus of documents that contain said filtered one or more terms includes using the secondary index to lookup a subset of documents of said corpus of documents that contain each term of said filtered one or more terms.

5. The method of claim 1, wherein the wildcard expression comprises a left truncated, right truncated, or double truncated wildcard expression.

6. The method of claim 1, further comprising:
for a new document that includes one or more additional terms, determining, for each term of the one or more additional terms included in the new document, whether the respective term exists in the second index;
in response to determining that a particular term of the one or more additional terms included in the new document exists in the second index, adding an identifier associated with the new document to a respective subset of documents of the corpus of documents that contain the particular term.

7. The method of claim 6, further comprising: in response to determining that the particular term of the one or more additional terms included in the new document does not exist in the second index, adding the particular term and new document identifier to said second index.

8. The method of claim 7, wherein adding the particular term and new document identifier to said second index includes adding a corresponding hash value for the particular term to said second index.

9. The method of claim 7, further comprising: adding a corresponding hash value for the particular term to said first index.

10. One or more non-transitory computer-readable storage medium storing instructions that, when executed by one or more processors, cause the one or more processors to perform a method comprising:
generating a plurality of query K-gram tokens for a wildcard expression in a query;
using a first index, determining an intersection of hash tokens, wherein said first index indexes each query K-gram token of said plurality of K-gram tokens to a respective subset of hash tokens of a plurality of hash tokens, each hash token of said plurality of hash tokens corresponding to a term found in one or more documents of a corpus of documents;
wherein determining the intersection of hash tokens includes performing one or more numeric comparisons of hash tokens;
wherein said intersection of hash tokens comprises only hash tokens indexed to all of said plurality of query K-gram tokens by said first index;
using a second index, determining one or more terms that correspond to the intersection of hash tokens, said second index indexing said plurality of hash tokens to a plurality of terms in said corpus of documents
wherein determining the one or more terms that correspond to the intersection of hash tokens includes, for each hash token of said intersection of hash tokens, using a numeric equality search to lookup in said second index one or more terms that are indexed to said each hash token;
filtering the one or more terms that correspond to the intersection of hash tokens to remove a term from the one or more terms that does not match said wildcard expression thereby generating filtered one or more terms;
determining documents of said corpus of documents that contain the filtered one or more terms.

11. The non-transitory computer-readable storage medium of claim 10, wherein said first index comprises a table and wherein said second index comprises a table.

12. The non-transitory computer-readable storage medium of claim 10, wherein said second index includes a secondary index on a numeric column that contains said plurality of hash tokens.

13. The non-transitory computer-readable storage medium of claim 12, wherein determining the documents of said corpus of documents that contain said filtered one or more terms includes using the secondary index to lookup a subset of documents of said corpus of documents that contain each term of said filtered one or more terms.

14. The non-transitory computer-readable storage medium of claim 10, wherein the wildcard expression comprises a left truncated, right truncated, or double truncated wildcard expression.

15. The non-transitory computer-readable storage medium of claim 10, wherein the instructions, when executed by the one or more processors, further cause:
for a new document that includes one or more additional terms, determining, for each term of the one or more additional terms included in the new document, whether the respective term exists in the second index;
in response to determining that a particular term of the one or more additional terms included in the new document exists in the second index, adding an identifier associated with the new document to a respective subset of documents of the corpus of documents that contain the particular term.

16. The non-transitory computer-readable storage medium of claim 15, wherein the instructions, when executed by the one or more processors, further cause:
in response to determining that the particular term of the one or more additional terms included in the new document does not exist in the second index, adding the particular term and new document identifier to said second index.

17. The non-transitory computer-readable storage medium of claim 16, wherein adding the particular term and new document identifier to said second index includes adding a corresponding hash value for the particular term to said second index.

18. The non-transitory computer-readable storage medium of claim 16, wherein the instructions, when executed by the one or more processors, further cause:
adding a corresponding hash value for the particular term to said first index.

* * * * *

UNITED STATES PATENT AND TRADEMARK OFFICE
CERTIFICATE OF CORRECTION

PATENT NO. : 11,188,594 B2
APPLICATION NO. : 15/891145
DATED : November 30, 2021
INVENTOR(S) : Kadwe et al.

It is certified that error appears in the above-identified patent and that said Letters Patent is hereby corrected as shown below:

In the Specification

In Column 1, Line 30, delete ""% or %"" and insert -- "%or%" --, therefor.

In Column 2, Line 56, delete "'example." and insert -- 'example'. --, therefor.

In Column 2, Line 57, delete "form'%example'" and insert -- form '%example' --, therefor.

In Column 2, Line 59, delete "sub string" and insert -- substring --, therefor.

In Column 3, Line 30, delete "'ad'," and insert -- 'rac', 'acl', 'cle', --, therefor.

In Column 3, Line 37, after "'ora'," insert -- 'rac', --.

In Column 3, Line 66, delete "'me'" and insert -- 'rac' --, therefor.

In Column 5, Lines 30-31, delete "'red %'" and insert -- 'red%' --, therefor.

In Column 5, Line 37, delete "'red %'" and insert -- 'red%' --, therefor.

In Column 5, Line 44, delete "'red %'." and insert -- 'red%'. --, therefor.

In Column 5, Line 46, delete "'red %'" and insert -- 'red%' --, therefor.

In Column 6, Line 27, delete ""%oracle%" and insert -- '%oracle%' --, therefor.

In Column 6, Line 29, delete "'ad'," and insert -- 'rac', 'acl', --, therefor.

In Column 8, Line 17, delete "402N," and insert -- 502N, --, therefor.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*

In Column 9, Line 64, delete "DbaaS" and insert -- DBaaS --, therefor.

In the Claims

In Column 13, Line 14, in Claim 4, after "determining" insert -- the --.